United States Patent
Ebato et al.

(10) Patent No.: US 9,609,204 B2
(45) Date of Patent: Mar. 28, 2017

(54) AUTO-FOCUS DEVICE AND METHOD FOR CONTROLLING OPERATION OF SAME

(71) Applicant: FUJIFILM Corporation, Tokyo (JP)

(72) Inventors: Takashi Ebato, Saitama (JP); Takahisa Sato, Saitama (JP); Aiko Sekiya, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/959,663

(22) Filed: Dec. 4, 2015

(65) Prior Publication Data

US 2016/0094781 A1    Mar. 31, 2016

Related U.S. Application Data

(63) Continuation of application No. PCT/JP2014/063775, filed on May 26, 2014.

(30) Foreign Application Priority Data

Jun. 6, 2013  (JP) .................................. 2013-119413

(51) Int. Cl.
*H04N 5/232*    (2006.01)
*G03B 13/00*    (2006.01)
(Continued)

(52) U.S. Cl.
CPC ........... *H04N 5/23212* (2013.01); *G02B 7/09* (2013.01); *G02B 7/282* (2013.01); *G02B 7/343* (2013.01);
(Continued)

(58) Field of Classification Search
CPC ............. H04N 5/23212; H04N 5/3696; H04N 5/23293; H04N 5/2254; H04N 5/232;
(Continued)

(56) References Cited

U.S. PATENT DOCUMENTS

| 2007/0230937 | A1* | 10/2007 | Ide | G02B 7/36 396/125 |
| 2011/0170846 | A1* | 7/2011 | Sung | G02B 7/38 396/90 |
| 2013/0314511 | A1* | 11/2013 | Chen | H04N 5/23222 348/50 |

FOREIGN PATENT DOCUMENTS

| JP | 4946311 B2 | 6/2012 |
| JP | 4962021 B2 | 6/2012 |

OTHER PUBLICATIONS

International Search Report, issued in PCT/JP2014/063775, dated Aug. 26, 2014.

\* cited by examiner

*Primary Examiner* — Xi Wang
(74) *Attorney, Agent, or Firm* — Birch, Stewart, Kolasch & Birch, LLP

(57) ABSTRACT

An auto-focus device, for eliminating an uncomfortable feeling when phase difference AF is switched to optical path length difference AF when an arbitrary area is set as a focusing target area, and a method for controlling operation of the same. A desired area is set as the focusing target area. Until a first threshold value position is reached, the focus lens is moved based on a phase difference AF evaluation value obtained from a phase difference AF sensor so as to bring the center portion of the imaging area into focus. Until a second threshold value position is reached, the focus lens is moved based on a phase difference AF evaluation value which is obtained from a signal of an area corresponding to the set focusing target area. When the focus lens reaches the second threshold value position, the focus lens is positioned at the focusing position.

6 Claims, 12 Drawing Sheets

(51) Int. Cl.

| | |
|---|---|
| *G02B 15/14* | (2006.01) |
| *G03B 13/36* | (2006.01) |
| *G02B 7/28* | (2006.01) |
| *G02B 7/34* | (2006.01) |
| *H04N 5/225* | (2006.01) |
| *G02B 7/09* | (2006.01) |
| G02B 7/36 | (2006.01) |
| G02B 7/38 | (2006.01) |

(52) U.S. Cl.
CPC ........... *G03B 13/36* (2013.01); *H04N 5/2254* (2013.01); *H04N 5/232* (2013.01); *H04N 5/23245* (2013.01); *H04N 5/23293* (2013.01); *G02B 7/36* (2013.01); *G02B 7/38* (2013.01)

(58) Field of Classification Search
CPC ................ H04N 5/23245; G03B 13/36; G02B 7/04–7/105; G02B 27/16; G02B 27/40; G02B 7/34–7/346
USPC ....... 348/345, 348, 349–357, 364, 365, 340, 348/222.1, 89–152; 356/3–5.15, 356/3.13–3.16; 396/79–83; 250/201.4, 250/201.6, 201.7; 352/139, 140; 382/255; 359/696, 698
See application file for complete search history.

AUTO-FOCUS DEVICE AND METHOD FOR CONTROLLING OPERATION OF SAME

CROSS-REFERENCE TO RELATED APPLICATIONS

This application is a Continuation of PCT International Application No. PCT/JP2014/063775 filed on May 26, 2014, which claims priority under 35 U.S.C. §119(a) to Japanese Patent Application No. 2013-119413 filed Jun. 6, 2013. Each of the above application(s) is hereby expressly incorporated by reference, in its entirety, into the present application.

BACKGROUND OF THE INVENTION

1. Field of the Invention

The invention relates to an auto-focus device and a method for controlling operation of the same.

2. Description of the Related Art

Examples of auto-focus modes of a camera include phase difference AF (auto-focus) and contrast AF. In the phase difference AF, light incident from a lens is divided into two or three or more rays through a pupil division, and is guided into a phase difference AF sensor, and a focusing direction and an amount of defocus are determined on the basis of an amount of position shift or a position shift direction of directions of division of the images divided through the pupil division. In the contrast AF, by locating a high contrast portion while moving a focus lens on the basis of an image captured by an imaging element, a focus is adjusted thereto. In a television camera, an image of a subject is captured by two imaging elements which are disposed at positions where optical path lengths are different from each other, and the contrast AF (optical path length difference AF) for adjusting a focus on the basis of the image signals obtained from respective imaging elements is used. The contrast AF is characterized in that accuracy in focusing is high while a focusing speed is low. The phase difference AF is characterized in that the focusing speed is high while the accuracy in focusing is low. Thus, in order to compensate for respective defects, a system having both the contrast AF and the phase difference AF may be used. Further, as a system having both the contrast AF and the phase difference AF, there is a system in which a width of WOB for finding the focusing direction by moving the focus lens by a small distance is increased when a detection area of the phase difference AF and a detection area of the contrast AF do not coincide with each other (JP4946311B). Alternatively, there is also a system in which a focusing evaluation value of the contrast AF is used when the detection area of the phase difference AF and the detection area of the contrast AF coincide with each other and the focusing evaluation value of the contrast AF is greater than the threshold value (JP4962021B).

SUMMARY OF THE INVENTION

In the phase difference AF, a location, at which an image is formed on an imaging surface of the phase difference imaging element, is changed in accordance with a distance to a subject. Therefore, an area to be brought into focus cannot be arbitrarily set. However, in the contrast AF, the area to be brought into focus can be arbitrarily set. In the phase difference AF, the focus lens is moved such that the center portion of the imaging area is brought into focus. Therefore, after focusing control is performed using the phase difference AF, when control is performed to bring an arbitrary area into focus through the contrast AF, an image area to be brought into focus at the time of the switching is also switched, and thus a target subject is not smoothly brought into focus. As a result, this causes an uncomfortable feeling. In both JP4946311B and JP4962021B, the uncomfortable feeling is not considered at all.

The invention has an object to eliminate an uncomfortable feeling caused when the phase difference AF is switched to the contrast AF in a case of setting the arbitrary area as the focusing target area.

According to the invention, there is provided an auto-focus device including: a focusing target area setting section that sets a focusing target area to be brought into focus in an imaging area; a phase difference AF section that outputs a first focusing evaluation value signal, which indicates an amount of defocus, on the basis of an output signal which is obtained from one phase difference imaging element which forms a plurality of subject images, into which light incident through a focus lens is divided through a pupil division, on an imaging surface; an optical path length difference AF section that outputs a second focusing evaluation value signal, which indicates an amount of defocus, on the basis of respective output signals of a first imaging element and a second imaging element which are disposed at positions where optical path lengths are different from each other in optical paths of light incident through the focus lens; a focusing position estimation section that estimates a focusing position on the basis of at least one of the first focusing evaluation value signal and the second focusing evaluation value signal; a focus lens position detection section that detects a position of the focus lens; a focus lens position evaluation section that calculates a difference between the position of the focus lens and the focusing position estimated by the focusing position estimation section; an AF switching section that sets, as a focusing evaluation value signal, the first focusing evaluation value signal which is output from the phase difference AF section on the basis of an output signal obtained from a center portion of the phase difference imaging element, when the difference between the position of the focus lens and the estimated focusing position is greater than a first threshold value, sets, as a focusing evaluation value signal, the first focusing evaluation value signal which is output from the phase difference AF section on the basis of an output signal obtained from the focusing target area of the phase difference imaging element, when the difference is greater than a second threshold value and is equal to or less than the first threshold value, and sets, as a focusing evaluation value signal, the second focusing evaluation value signal which is output to the optical path length difference AF section on the basis of output signals obtained from the focusing target areas of the first imaging element and the second imaging element, when the difference is equal to or less than the second threshold value; and a focus lens movement control section that moves the focus lens on the basis of the focusing evaluation value signal which is output in the AF switching section.

The invention provides a method for controlling operation appropriate for the auto-focus device. That is, the method includes: setting a focusing target area to be brought into focus in an imaging area, through a focusing target area setting section; outputting a first focusing evaluation value signal, which indicates an amount of defocus, on the basis of an output signal which is obtained from one phase difference imaging element which forms a plurality of subject images, into which light incident through a focus lens is divided through a pupil division, on an imaging surface, through a phase difference AF section; outputting a second focusing evaluation value signal, which indicates an amount of defocus, on the basis of respective output signals of a first imaging element and a second imaging element which are disposed at positions where optical path lengths are different from each other in optical paths of light incident through the focus lens, through an optical path length difference AF section; estimating a focusing position on the basis of at least one of the first focusing evaluation value signal and the second focusing evaluation value signal, through a focusing position estimation section; detecting a position of the focus lens through a focus lens position detection section; calculating a difference between the position of the focus lens and the focusing position estimated by the focusing position estimation section, through a focus lens position evaluation section; setting, as a focusing evaluation value signal, the first focusing evaluation value signal which is output from the phase difference AF section on the basis of an output signal obtained from a center portion of the phase difference imaging element, when the difference between the position of the focus lens and the estimated focusing position is greater than a first threshold value, setting, as a focusing evaluation value signal, the first focusing evaluation value signal which is output from the phase difference AF section on the basis of an output signal obtained from the focusing target area of the phase difference imaging element, when the difference is greater than a second threshold value and is equal to or less than the first threshold value, and setting, as a focusing evaluation value signal, the second focusing evaluation value signal which is output to the optical path length difference AF section on the basis of output signals obtained from the focusing target areas of the first imaging element and the second imaging element, when the difference is equal to or less than the second threshold value, through an AF switching section; and moving the focus lens on the basis of the focusing evaluation value signal which is output in the AF switching section, through a focus lens movement control section.

According to the invention, the phase difference AF section outputs the first focusing evaluation value signal, which indicates the amount of defocus, on the basis of the output signal which is obtained from one phase difference imaging element which forms the plurality of subject images, into which the light incident through the focus lens is divided through the pupil division, on the imaging surface. Further, the optical path length difference AF section outputs the second focusing evaluation value signal, which indicates the amount of defocus, on the basis of respective output signals of the first imaging element and the second imaging element which are disposed at positions where the optical path lengths are different from each other in optical paths of light incident through the focus lens. The focusing position is estimated on the basis of at least one of the first focusing evaluation value signal and the second focusing evaluation value signal, and the difference between the position of the focus lens and the estimated focusing position is calculated. When the calculated difference is greater than the first threshold value, the first focusing evaluation value signal, which is based on the output signal obtained from the center portion of the phase difference imaging element, is set as the focusing evaluation value signal for moving the focus lens. When the calculated difference is greater than the second threshold value (the second threshold value is less than the first threshold value) and is equal to or less than the first threshold value, the first focusing evaluation value signal, which is based on the output signal obtained from the focusing target area of the phase difference imaging element, is set as the focusing evaluation value signal for moving the focus lens. When the calculated difference is equal to or less than the second threshold value, the second focusing evaluation value signal, which is based on the output signals obtained from the focusing target areas of the first imaging element and the second imaging element constituting the optical path length difference AF section, is set as the focusing evaluation value signal for moving the focus lens. In accordance with the magnitude of the calculated difference, the focusing evaluation value signal for moving the focus lens is changed. Therefore, the image area to be brought into focus can be prevented in advance from rapidly changing, and the target subject can be smoothly brought into focus.

It is preferable that the AF switching section sets, as a focusing evaluation value signal, the first focusing evaluation value signal which is output from the phase difference AF section on the basis of an output signal obtained from an extracted portion of the phase difference imaging element which is closer to the focusing target area at a smaller value of the difference and is closer to the center portion at a larger value of the difference, when the difference calculated in the focus lens position evaluation section is between a third threshold value equal to or greater than the first threshold value and a fourth threshold value equal to or greater than the second threshold value and equal to or less than the first threshold value.

For example, the focusing position estimation section performs first estimation after setting of the focusing target area performed by the focusing target area setting section by setting, as a focusing evaluation value signal, the first focusing evaluation value signal which is output from the phase difference AF section on the basis of the output signal obtained from the center portion of the phase difference imaging element.

For example, the phase difference imaging element is an area sensor. Further, it is preferable that the focusing target area, the center portion, and the extracted portion have the same size.

The image area to be brought into focus can be prevented in advance from rapidly changing, and the target subject can be smoothly brought into focus.

DESCRIPTION OF THE PREFERRED EMBODIMENTS

Figure 1:
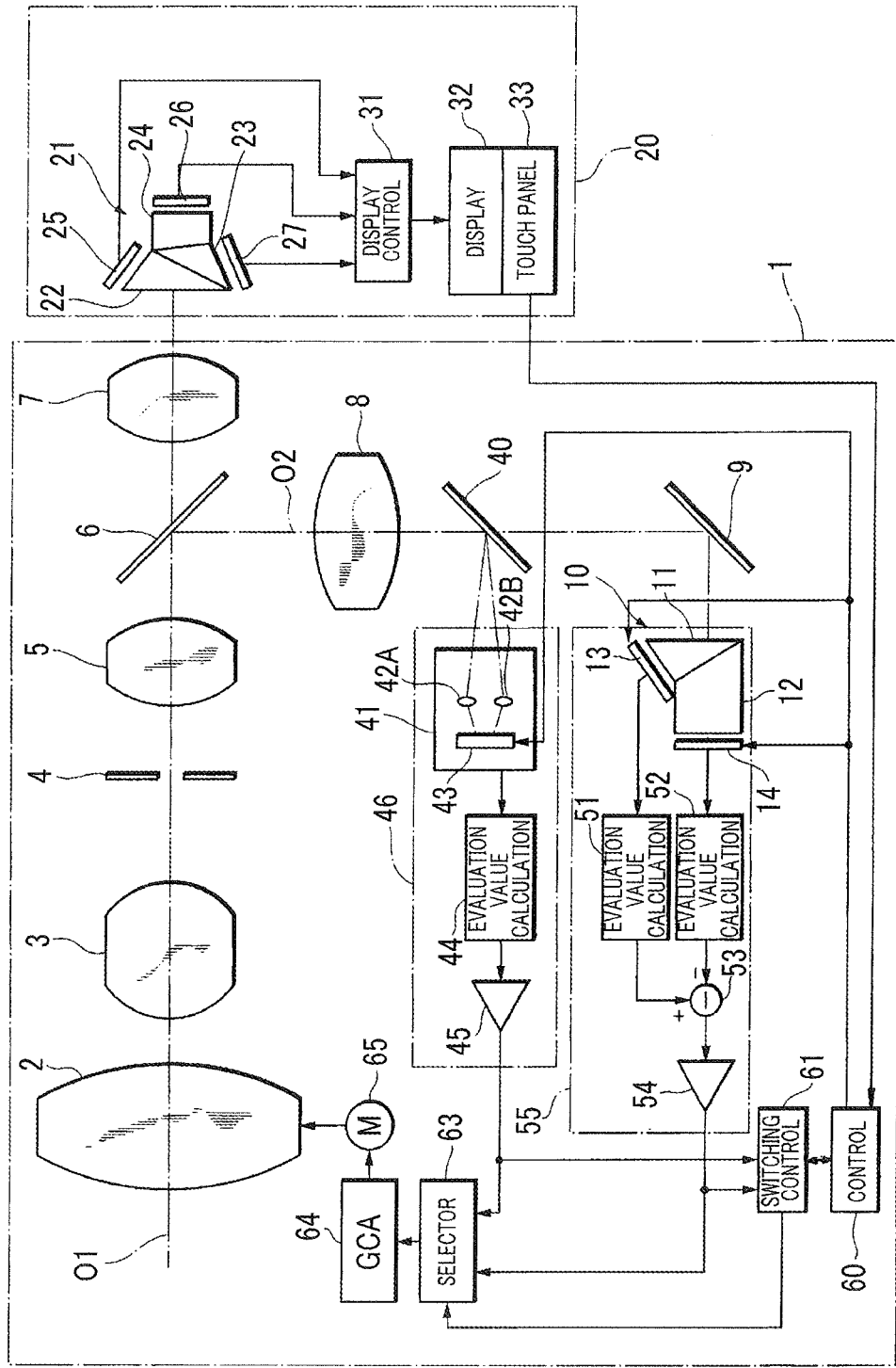
FIG. 1 shows a configuration of a photography lens unit.

FIG. 1 shows an optical configuration of a part of a camera main body 20 and a photography lens unit 1 used for broadcast according to an example of the invention.

The photography lens unit 1 is detachably mounted on the camera main body 20.

The photography lens unit 1 includes a focus lens (focus lens group) 2, a zoom lens (zoom lens group) 3, a front relay lens (front relay lens group) 5, and a rear relay lens (rear relay lens group) 7 each of which has an optical axis which is the same as an optical axis O1 of the photography lens unit 1. A diaphragm 4 is disposed between the zoom lens 3 and the front relay lens 5 such that the optical axis O1 of the photography lens unit 1 passes through the center. Further, a half mirror 6 is disposed between the front relay lens 5 and the rear relay lens 7.

The camera main body 20 is provided with a color separation prism 21 that has an optical axis the same as the optical axis O1 of the photography lens unit 1 when the photography lens unit 1 is mounted. The color separation prism 21 includes a first prism 22, a second prism 23, and a third prism 24, and separates incident light into red, green, and blue components. A first imaging CCD 25, a second imaging CCD 26, and a third imaging CCD 27 are respectively disposed at a position facing an emergent surface of the first prism 22, at a position facing an emergent surface of the second prism 23, and at a position facing an emergent surface of the third prism 24.

The photography lens unit 1 is provided with an AF relay lens (AF relay lens group) 8 where a part of light reflected on the center of the half mirror 6 inputs and has an optical axis (auto-focus (AF) optical axis) O2. A half mirror 40 (which may be a reflection prism) is provided at the rear of the AF relay lens 8. Further, a total reflection mirror 9 is provided at the rear of the half mirror 40.

An optical path length difference AF sensor 55 is provided in a total reflection direction of the total reflection mirror 9. The optical path length difference AF sensor 55 includes a splitting prism 10 formed of a first prism 11 and a second prism 12. A first optical path length difference AF CCD 13 and a second optical path length difference AF CCD 14 are respectively provided on an emergent surface of the first prism 11 and an emergent surface of the second prism 12.

Rays incident into the photography lens unit 1 are transmitted through the focus lens 2, the zoom lens 3, the diaphragm 4, the front relay lens 5, the half mirror 6, and the rear relay lens 7, and are guided into the camera main body 20. Through the color separation prism 21 included in the camera main body 20, rays are respectively separated into a red light component, a green light component, and a blue light component, thereby respectively forming a subject image on the first imaging CCD 25, the second imaging CCD 26, and the third imaging CCD 27. Video signals indicating subject images of the red light component, the green light component, and the blue light component are respectively output from the first imaging CCD 25, the second imaging CCD 26, and the third imaging CCD 27.

The video signals, which indicate subject images of the red light component, the green light component, and the blue light component and which are respectively output from the first imaging CCD 25, the second imaging CCD 26, and the third imaging CCD 27, are sent to a display control device 31. When the display device 32 is controlled by the display control device 31, the subject image, which is obtained through imaging, is displayed on a display screen of the display device 32. A cameraman determines a camera angle while viewing the subject image which is being displayed on the display screen of the display device 32.

A touch panel 33 is also formed on the display screen of the display device 32. When the cameraman touches a desired region on the touch panel 33, a signal, which indicates the region, is input to a control device 60 of the photography lens unit 1. As described later in detail, the focus lens 2 is controlled such that it focuses the subject image in the desired region which is touched by the cameraman. However, it is needless to say that the focus lens 2 may be controlled such that it brings a face or the like, which is not designated by the cameraman and is detected through face detection or the like, into focus.

The rays, which are incident into the photography lens unit 1, are partially reflected by the half mirror 6. The rays, which are reflected by the half mirror 6, are transmitted through the AF relay lens 8, and are guided into the half mirror 40.

A part of light, which is incident into the half mirror 40, is reflected, and is incident into a phase difference sensor 41 included in a phase difference AF sensor 46 (phase difference AF section).

The phase difference sensor 41 includes two separator lenses 42A and 42B. The separator lens 42A and 42B separate the subject image into two images through pupil division. The two subject images are formed on the light receiving surface of a single phase difference imaging element 43 (for example, an area sensor). The output signal from the phase difference imaging element 43 is input to an evaluation value calculation circuit 44. In the evaluation value calculation circuit 44, a phase difference AF evaluation value, which indicates a degree of focusing of the subject image obtained through imaging, is generated from an interval between the two subject images. A signal (first focusing evaluation value signal indicating an amount of defocus), which indicates a phase difference AF evaluation value, is input to a selector 63 through an amplification circuit 45.

The light, which is transmitted through the half mirror 40, is totally reflected by the total reflection mirror 9. The rays, which are totally reflected by the total reflection mirror 9, are incident into the splitting prism 10, some of the rays are incident into the first optical path length difference AF CCD 13 (first imaging element), and the rest are incident into the second optical path length difference AF CCD 14 (second imaging element). AF signals are respectively output from the first optical path length difference AF CCD 13 and the second optical path length difference AF CCD 14. The first optical path length difference AF CCD 13 and the second optical path length difference AF CCD 14 are disposed at positions where optical path lengths thereof are different from each other, in the optical path of light incident through the focus lens.

The signals, which are respectively output from the first optical path length difference AF CCD 13 and the second optical path length difference AF CCD 14, are respectively input to evaluation value calculation circuits 51 and 52, and respective evaluation values, which indicate degrees of focusing of the focus lens 2, are calculated. The signals, which indicate evaluation values respectively calculated by the evaluation value calculation circuits 51 and 52, are sent to a subtraction circuit 53. The subtraction circuit 53 subtracts the signal, which indicates the evaluation value calculated by the evaluation value calculation circuit 52, from the signal which indicates the evaluation value calculated by the evaluation value calculation circuit 51, thereby obtaining a differential AF evaluation value. An amplification circuit 54 amplifies a signal (second focusing evaluation value signal indicating the amount of defocus), which indicates the differential AF evaluation value, and sends the signal to a selector 63 (AF switching section).

The phase difference AF evaluation value signal, which is output from the amplification circuit 45, and the differential AF evaluation value signal, which is output from the amplification circuit 54, are also input to a switching control circuit 61. The switching control circuit 61 (AF switching section) controls the selector 63 on the basis of the input phase difference AF evaluation value signal and the input differential AF evaluation value signal, such that it sends either the phase difference AF evaluation value signal, which is output from the amplification circuit 45, or the differential AF evaluation value signal, which is output from the amplification circuit 54, to a gain control amplification circuit 64. By using a gain coefficient which is set in accordance with the phase difference AF evaluation value signal and the differential AF evaluation value signal, the input signal is amplified, and is sent as a control signal, which indicates a rotation direction and a rotation speed, to a focus motor 65. The focus motor 65 (focus lens movement control section) moves the focus lens 2.

The phase difference AF evaluation value signal output from the amplification circuit 45 and the differential AF evaluation value signal output from the amplification circuit 54, are simply transmitted through the switching control circuit 61, and are also input to the control device 60 for integrally controlling the above-mentioned circuits and the like. The control device 60 estimates a focusing position by using at least one of the input phase difference AF evaluation value signal and the input differential AF evaluation value signal (focusing position estimation section). Further, in the control device 60, a difference between the position of the focus lens 2 and the estimated focusing position is calculated (focus lens position evaluation section).

Figure 2:
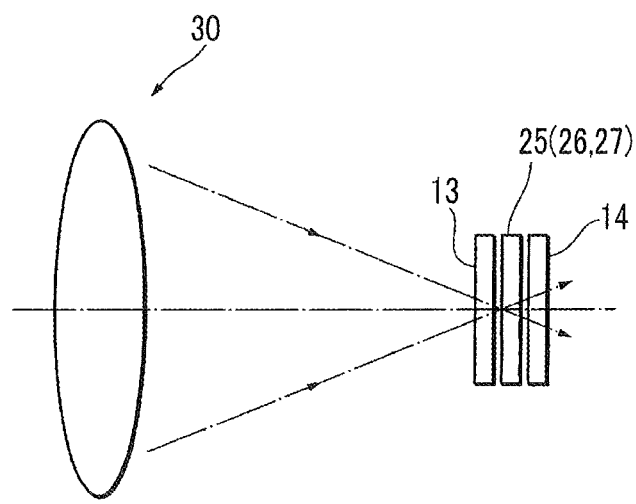
FIG. 2 shows a relationship between an image forming position of a subject image and an imaging element for optical path length difference AF.

FIG. 2 shows a relationship between optical distances of the first imaging CCD 25, the second imaging CCD 26, and the third imaging CCD 27, and the first optical path length difference AF CCD 13 and the second optical path length difference AF CCD 14.

A lens 30 is an optical system for making light be incident into the first imaging CCD 25, the second imaging CCD 26, and the third imaging CCD 27, and the first optical path length difference AF CCD 13 and the second optical path length difference AF CCD 14.

All the optical distances of light, which is incident into the first imaging CCD 25, the second imaging CCD 26, and the third imaging CCD 27, are equal. On the other hand, the optical distance of light, which is incident into the first optical path length difference AF CCD 13, is equal thereto when the first optical path length difference AF CCD 13 is disposed in front of the first imaging CCD 25, the second imaging CCD 26, and the third imaging CCD 27 at a predetermined distance therefrom. The optical distance of light, which is incident into the second optical path length difference AF CCD 14, is equal thereto when the second optical path length difference AF CCD 14 is disposed to the rear of the first imaging CCD 25, the second imaging CCD 26, and the third imaging CCD 27 at a predetermined distance therefrom. The above conditions define a positional relationship (positions optically equidistant from the front and rear sides) between the first imaging CCD 25, the second imaging CCD 26, and the third imaging CCD 27, and the first optical path length difference AF CCD 13 and the second optical path length difference AF CCD 14. If the first imaging CCD 25, the second imaging CCD 26, and the third imaging CCD 27, and the first optical path length difference AF CCD 13 and the second optical path length difference AF CCD 14 are disposed on the same optical axis, these disposition are equivalent to a state where the first optical path length difference AF CCD 13 and the second optical path length difference AF CCD 14 are disposed at positions equidistant from the front and rear sides of the first imaging CCD 25, the second imaging CCD 26, and the third imaging CCD 27.

Figure 3:
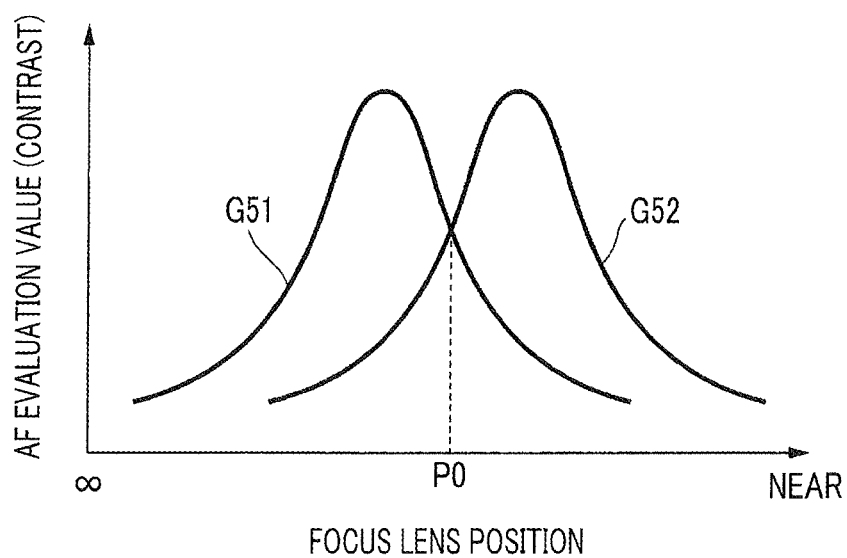
FIG. 3 shows a relationship between a focus lens position and an AF evaluation value.

FIG. 3 shows a relationship between the position of the focus lens 2 and the AF evaluation value.

On the basis of the signal which is output from the first optical path length difference AF CCD 13, it is possible to obtain a graph G51 from the evaluation value signal which is calculated by the evaluation value calculation circuit 51. On the basis of the signal which is output from the second optical path length difference AF CCD 14, it is possible to obtain a graph G52 from the evaluation value signal which is calculated by the evaluation value calculation circuit 52.

As described above, when the first imaging CCD 25, the second imaging CCD 26, and the third imaging CCD 27, and the first optical path length difference AF CCD 13 and the second optical path length difference AF CCD 14 are disposed on the same optical axis, these disposition are equivalent to a state where the first optical path length difference AF CCD 13 and the second optical path length difference AF CCD 14 are disposed at the positions equidistant from the front and rear sides of the first imaging CCD 25, the second imaging CCD 26, and the third imaging CCD 27. Accordingly, a focus lens position P0 is a position of the focus lens 2 that focuses the subject image on the first imaging CCD 25, the second imaging CCD 26, and the third imaging CCD 27. The focus lens position P0 is an intersection point between the graphs G51 and G52 obtained from the respective signals of the first optical path length difference AF CCD 13 and the second optical path length difference AF CCD 14.

Figure 4:
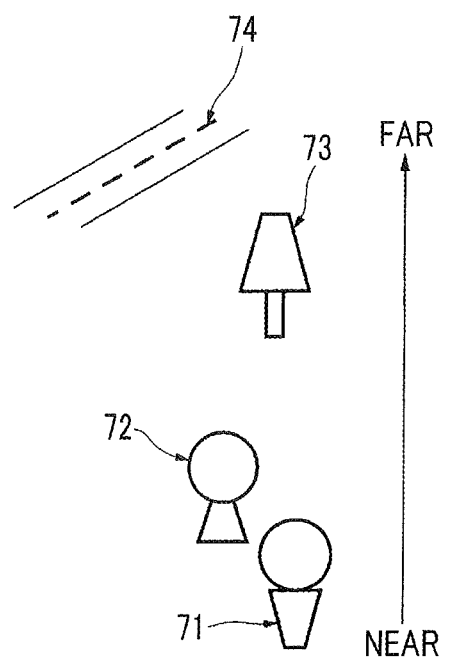
FIG. 4 is an example of subjects.

FIG. 4 is an example of imaging target subjects.

In FIG. 4, examples of the imaging targets include a male 71, a female 72, a tree 73, and a road 74. In order of the male 71, the female 72, the tree 73, and the road 74, the distance thereto from a camera equipped with the photography lens unit 1 increases.

Figure 5:
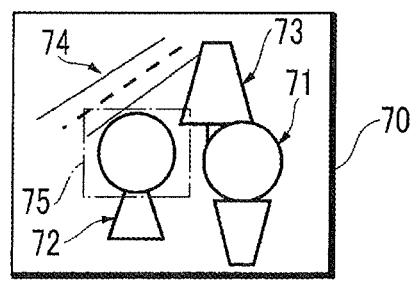
FIG. 5 is an example of the subject image obtained through imaging.

FIG. 5 shows a subject image 70 which is captured by photographing the imaging targets shown in FIG. 4 through the camera main body 20.

The subject image 70 includes a male image 71, a female image 72, a tree image 73, and a road image 74. These images are represented by the same reference numerals as those of the imaging targets shown in FIG. 4. The subject image is displayed on a display screen of the display device 32 which is provided on the camera main body 20. A cameraman touches the touch panel 33 formed on the display screen, thereby designating a desired area of the subject image 70, which is displayed on the display screen, as a focusing target area. In this example, a face image part of the female image 72 is designated as a focusing target area 75.

The subject images, which are captured by the first optical path length difference AF CCD 13 and the second optical path length difference AF CCD 14 included in the optical path length different AF sensor 55, are the same as the subject image 70 which is obtained by the camera main body 20. Accordingly, the image of an area, which corresponds to the focusing target area 75 designated by the cameraman, corresponds to an image within the focusing target area 75 designated in the subject image 70. Hence, the image within the focusing target area 75 is focused when the focus lens 2 is moved on the basis of the signal obtained in accordance with the area corresponding to the focusing target area 75 in light receiving surfaces of the first optical path length difference AF CCD 13 and the second optical path length difference AF CCD 14 included in the phase difference sensor 55. However, as described later, the image within the focusing target area 75 may not be focused even when the focus lens 2 is moved on the basis of the signal obtained in accordance with the area corresponding to the focusing target area 75 in a light receiving surface of the phase difference imaging element 43 included in the phase difference AF sensor 46.

Figure 6:
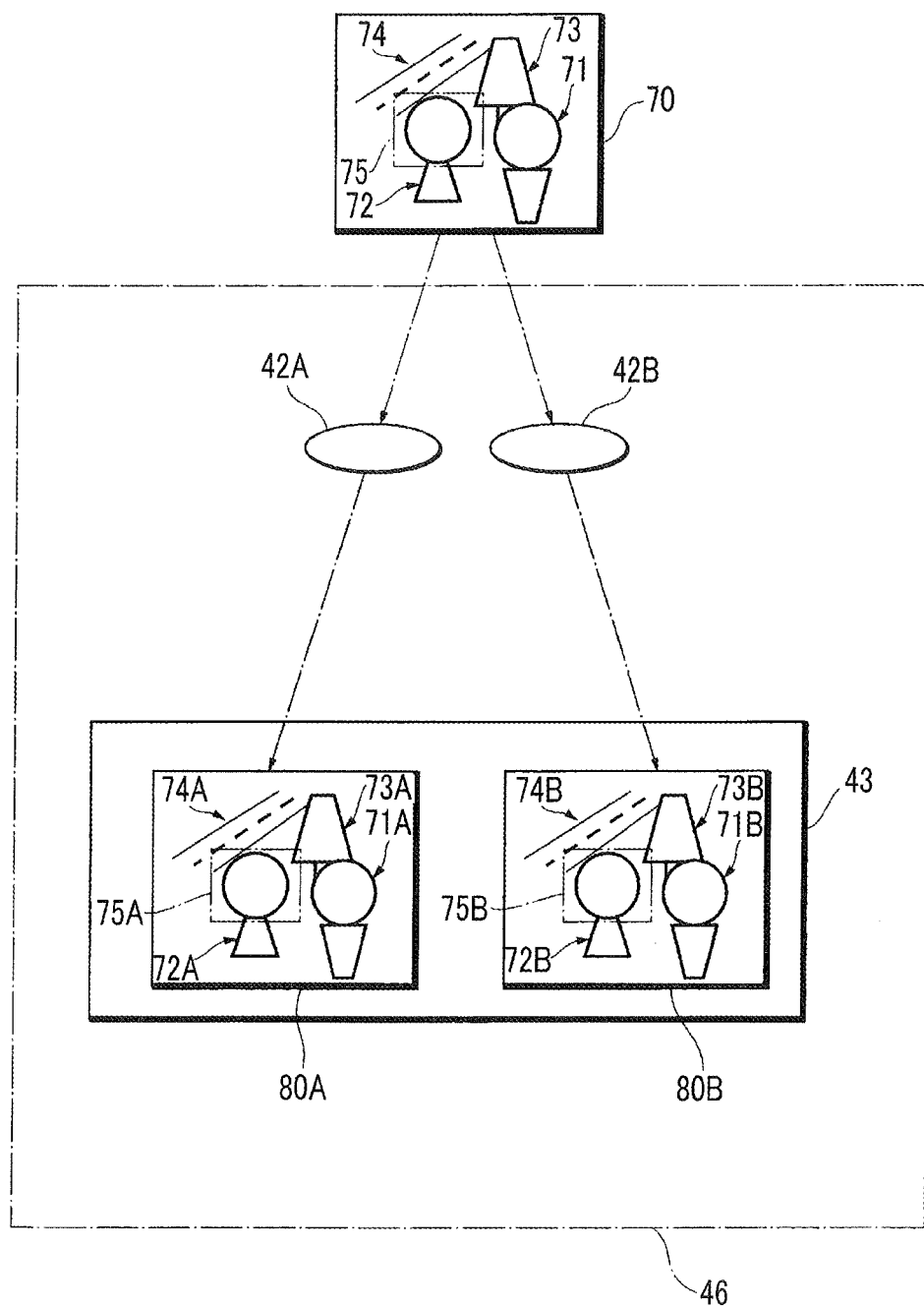
FIG. 6 is an example of an image which is captured by a phase difference imaging element.

In FIG. 6, the subject image 70, which is obtained through imaging of the subject, is divided into two images (a base image 80A and a reference image 80B) through separator lenses 42A and 42B included in the phase difference sensor 41, and the images are formed on the light receiving surface of the phase difference imaging element 43. The base image 80A includes a male image 71A, a female image 72A, a tree image 73A, and a road image 74A corresponding to the male image 71, the female image 72, the tree image 73, and the road image 74. Further, the reference image 80B also includes a male image 71B, a female image 72B, a tree image 73B, and a road image 74B corresponding to the male image 71, the female image 72, the tree image 73, and the road image 74. In the base image 80A and the reference image 80B, focusing target areas 75A and 75B designated by the cameraman are respectively displayed.

Figure 7:
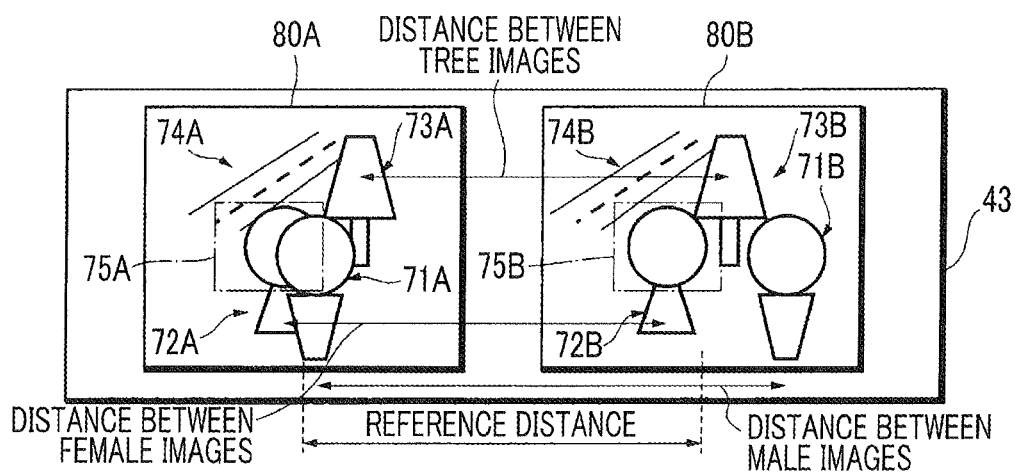
FIG. 7 is an example of images which are captured by the phase difference imaging element.

FIG. 7 is an example of the base image 80A and the reference image 80B formed on the light receiving surface of the phase difference imaging element 43.

Figure 8:
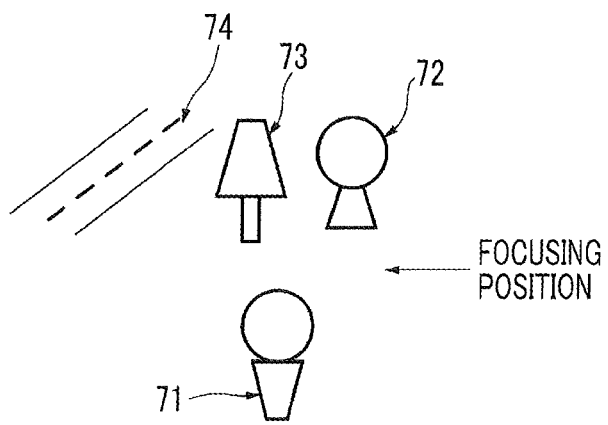
FIG. 8 shows a positional relationship between the subjects.

The example shown in FIG. 7 is obtained when the focus lens 2 is positioned to bring a subject into focus. The subject is at a distance between the male 71 and the female 72 in FIG. 4. This state is substantially equivalent to a state where the male 71 is closer than the focusing position, and the female 72, the tree 73, and the road 74 are further away than the focusing position as shown in FIG. 8.

The distance between the base image 80A and the reference image 80B is set as a reference distance. The reference distance is the same as a distance between the images, which are being focused, in images respectively included in the base image 80A and the reference image 80B. A distance between images of a subject further away than the subject present at the focusing position becomes smaller than the reference distance, and a distance between images of a subject closer than the subject present at the focusing position becomes greater than the reference distance. Since the male 71 is closer than the focusing position, the distance between the male images 71A and 71B is greater than the reference distance. Since the female 72, the tree 73, and the road 74 are further away than the focusing position, the distance therebetween is smaller than the reference distance. As a result, since the female images 72A and 72B are on the inside, even when the focusing target areas 75A and 75B are defined to be at positions corresponding to the position designated by the cameraman in the base image 80A and the reference image 80B, the areas 75A and 75B do not correspond to faces of the female images 72A and 72B, and positions of the faces are deviated from each other inside the focusing target areas 75A and 75B. Hence, the image within the area designated by the cameraman is not focused even when the focus lens 2 is moved on the basis of the signals obtained from the focusing target areas 75A and 75B.

Figure 9:
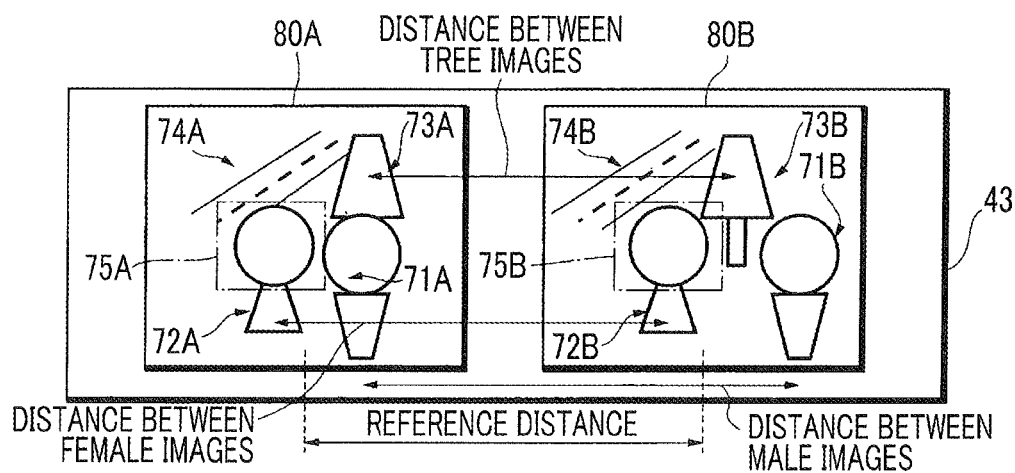
FIG. 9 is an example of an image which is captured by the phase difference imaging element.
Figure 10:
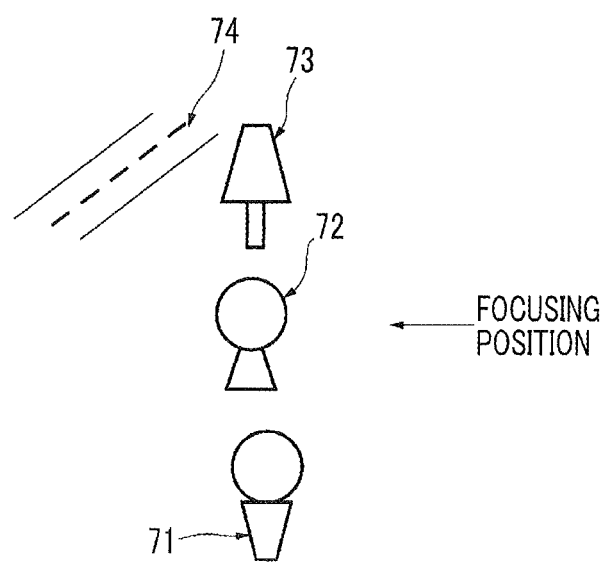
FIG. 10 shows a positional relationship between the subjects.

The example shown in FIG. 9 is obtained when the focus lens 2 is positioned to bring the female 72 of FIG. 4 into focus. This state is substantially equivalent to a state where the female 72 is at the focusing position, the male 71 is closer than the focusing position, and the tree 73 and the road 74 are further away than the focusing position as shown in FIG. 10.

As described above, since the male 71 is closer than the focusing position, the distance between the male images 71A and 71B is greater than the reference distance. Since the tree 73 and the road 74 are further away than the focusing position, both the distance between the tree images 73A and 73B and the distance between the road images 74A and 74B are smaller than the reference distance. In contrast, since the female 72 is at the focusing position, the distance between the female images 72A and 72B is approximately equal to the reference distance. Hence, when the focusing target areas 75A and 75B are defined to be at positions corresponding to the position designated by the cameraman in the base image 80A and the reference image 80B, the areas 75A and 75B are set on faces of the female images 72A and 72B. The image within the area designated by the cameraman is focused when the focus lens 2 is moved on the basis of the signals obtained from the focusing target areas 75A and 75B.

Figure 11:
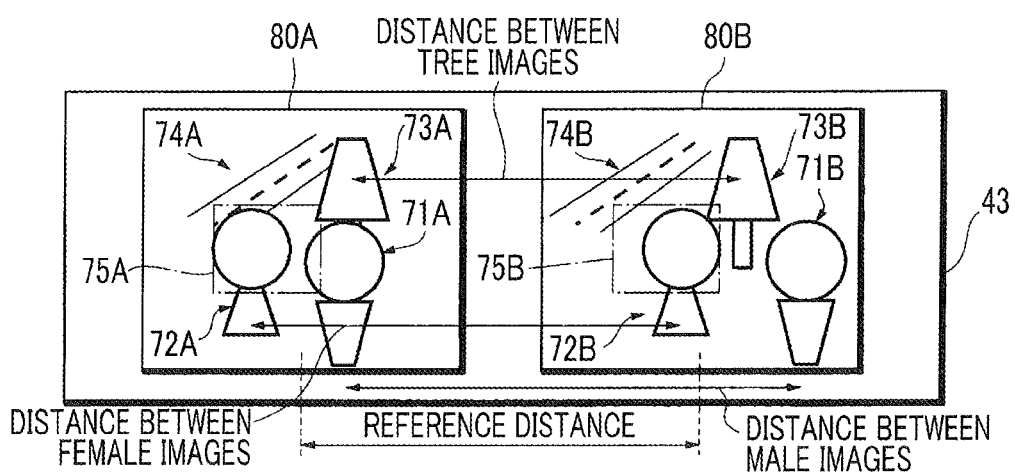
FIG. 11 is an example of an image which is captured by the phase difference imaging element.
Figure 12:
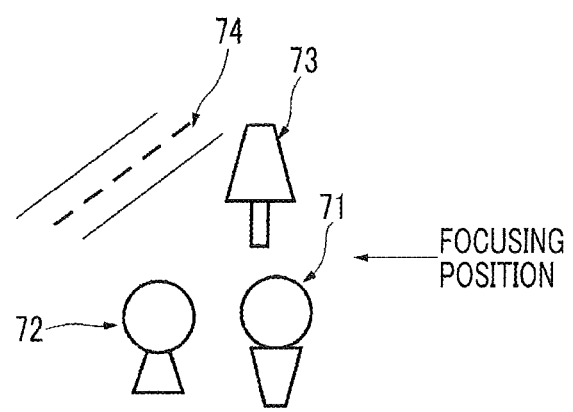
FIG. 12 shows a positional relationship between the subjects.

The example shown in FIG. 11 is obtained when the focus lens 2 is positioned to bring a subject into focus. The subject is at a distance between the female 72 and the tree 73 in FIG. 4. This state is substantially equivalent to a state where the male 71 and the female 72 are closer than the focusing position, and the tree 73 and the road 74 are further away than the focusing position as shown in FIG. 12.

As described above, the tree 73 and the like are further away than the focusing position, and therefore the distance between the tree images 73A and 73B is smaller than the reference distance. Further, the female 72 is closer than the focusing position, and therefore the distance between the female images 72A and 72B is greater than the reference distance. As a result, since the female images 72A and 72B are on the outside in contrast to the case shown in FIG. 9, even when the focusing target areas 75A and 75B are defined to be at positions corresponding to the position designated by the cameraman in the base image 80A and the reference image 80B, the areas 75A and 75B do not correspond to the faces of the female images 72A and 72B, and the positions of the faces are deviated from each other inside the focusing target areas 75A and 75B. Hence, the image within the area designated by the cameraman is not focused even when the focus lens 2 is moved on the basis of the signals obtained from the focusing target areas 75A and 75B.

As described above, when the subject shown in the image included in the focusing target area is substantially at the focusing position, the focus lens 2 is moved on the basis of the signal obtained from the area corresponding to the focusing target area of the phase difference imaging element 43, thereby focusing the image within the focusing target area. However, when the subject shown in the image included in the focusing target area is extremely deviated from the focusing position, even if the focus lens 2 is moved on the basis of the signal obtained from the area corresponding to the focusing target area of the phase difference imaging element 43, the image within the focusing target area, which is set by the cameraman, is not focused. In this example, until the subject shown in the image included in the focusing target area reaches substantially the focusing position, regardless of the set focusing target area, the focus lens 2 is moved on the basis of the signal obtained from the phase difference imaging element 43 at a center portion thereof. When the subject shown in the image included in the focusing target area reaches substantially the focusing position, then the focus lens 2 is moved on the basis of the signal obtained from the area corresponding to the focusing target area of the phase difference imaging element 43. Thereafter, by using the optical path length difference AF sensor 55, the focus lens 2 is moved to bring the focusing target area into focus.

Figure 13:
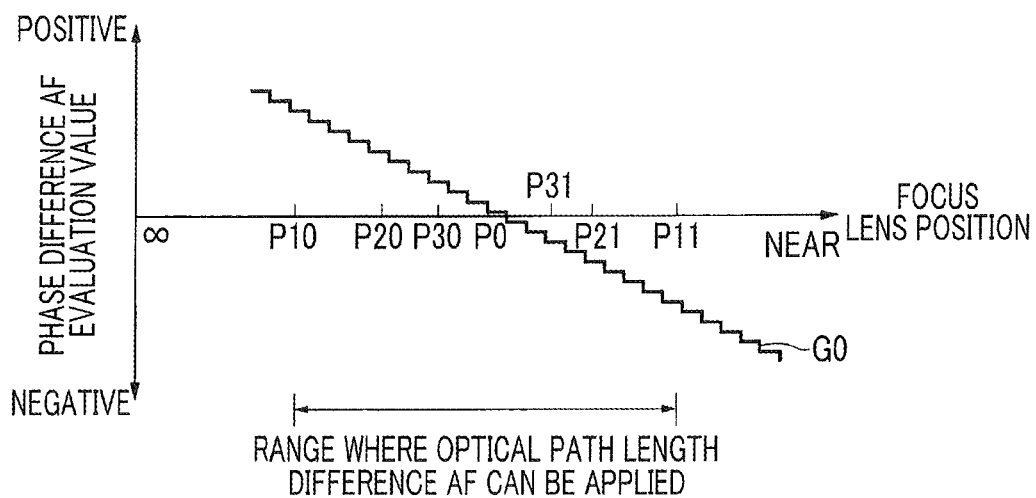
FIG. 13 shows a relationship between the focus lens position and a phase difference AF evaluation value.

FIG. 13 shows a relationship between the position of the focus lens 2 and the phase difference AF evaluation value. The horizontal axis indicates the position of the focus lens 2, and the vertical axis indicates the phase difference AF evaluation value.

When the evaluation value calculation circuit 42 calculates the phase difference AF evaluation value, the position of the focus lens 2 is detected from the relationship between the graph G0 and the calculated phase difference AF evaluation value. If the phase difference AF evaluation value is 0, the position P0 of the focus lens 2 is substantially the same as the focusing position at which the subject image is focused.

As shown in FIG. 13, the relationship between the focus lens 2 and the phase difference AF evaluation value of the graph G0 is indicated by a stepwise graph, and thus the graph does not completely correspond to the focusing position P0 when the phase difference AF evaluation value is 0.

Figure 14:
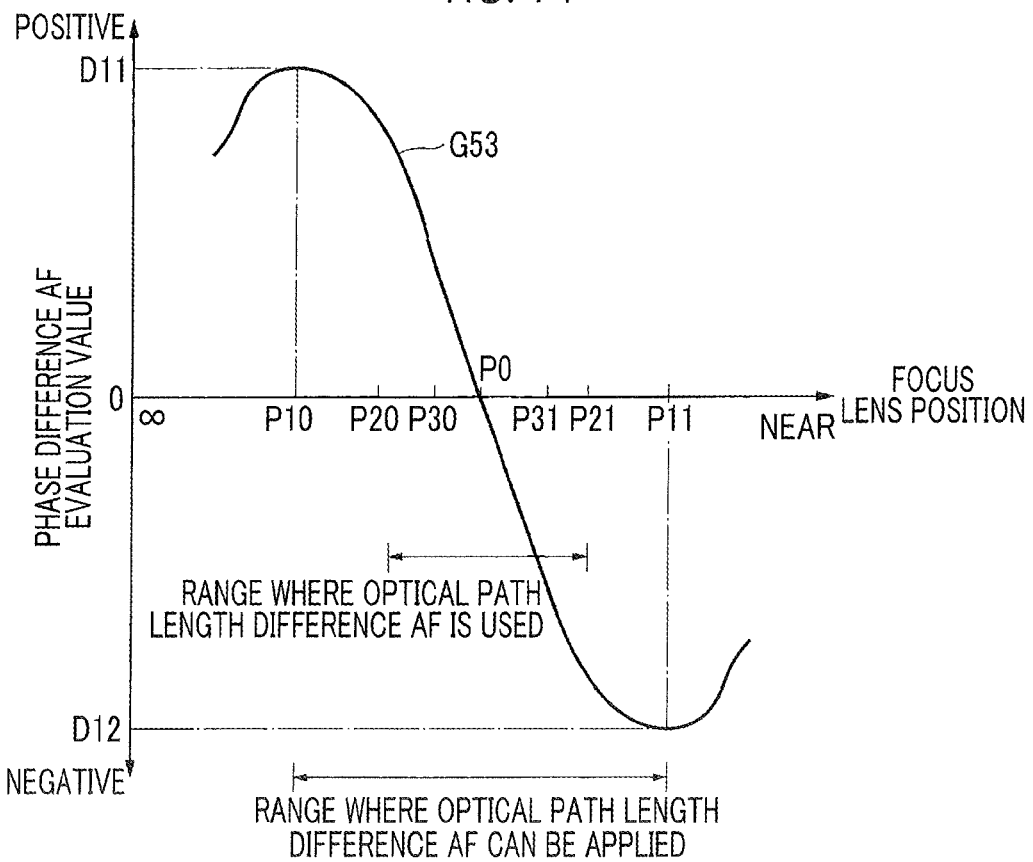
FIG. 14 shows a relationship between the focus lens position and a differential AF evaluation value.

FIG. 14 is a graph G53 showing a relationship between the position of the focus lens 2 and the differential AF evaluation value signal which is output from the subtraction circuit 53. The horizontal axis indicates the focus lens position, and the vertical axis indicates the differential AF evaluation value.

Between a positive peak value D11 and a negative peak value D12 of the differential AF evaluation value, the relationship between the position of the focus lens 2 and the differential AF evaluation value satisfies a one-to-one correspondence relationship. When the differential AF evaluation value is detected, the position of the focus lens 2 between a position P10 of the focus lens 2 corresponding to the positive peak value D11 and a position P11 of the focus lens 2 corresponding to the negative peak value D12 is also detected. It is possible to position the focus lens 2 at the focusing position P0 by using the differential AF evaluation value when the focus lens 2 is present between the positions P10 and P11 (a range where the optical path length difference AF can be applied).

As described above, in a positional relationship, the subject images, which are formed on the first optical path length difference AF CCD 13 and the second optical path length difference AF CCD 14, correspond to subject images which are formed on the first imaging CCD 25, the second imaging CCD 26, and the third imaging CCD 27. However, the subject image, which is formed on the phase difference imaging element 43, does not correspond to the subject images, which are formed on the first optical path length difference AF CCD 12 and the second optical path length difference AF CCD 13, or the subject images which are formed on the first imaging CCD 25, the second imaging CCD 26, and the third imaging CCD 27. Hence, as described above, when a cameraman sets a desired focusing target area, until the focus lens 2 reaches a position closer to the focusing position P0 than a first threshold value position P20 or P21 which is close to the focusing position P0, regardless of the focusing target area which is set by the cameraman, the focus lens 2 is moved to bring the center portion of the imaging area into focus on the basis of the phase difference AF evaluation value.

The focus lens 2 may be moved to a position closer to the focusing position P0 than a second threshold value position P30 or P31 which is closer to the focusing position P0 than the first threshold value position P20 or P21. In this case, a positional relationship between the light receiving surface and the subject image on the light receiving surface of the phase difference imaging element 43 becomes close to a positional relationship between the light receiving surface and the subject images on the light receiving surfaces of the first imaging CCD 25, the second imaging CCD 26, and the third imaging CCD 27. Hence, the focus lens 2 may be moved on the basis of the signal obtained from the phase difference imaging element 43 of the area corresponding to the position of the focusing target area which is set by the cameraman on the display screen of the display device 32. Even this move is substantially equivalent to a state where the focus lens 2 is moved on the basis of the signal which indicates an image within the focusing target area designated by the cameraman. The focus lens 2 is moved to bring the area, which is close to the focusing target area designated by the cameraman, into focus.

When the focus lens 2 reaches the position closer to the focusing position P0 than the second threshold value position P30 or P31, the focus lens 2 is moved on the basis of the differential AF evaluation value obtained from the focusing target area which is set by the cameraman. The imaging area of the first optical path length difference AF CCD 12 and the second optical path length difference AF CCD 13 obtaining the differential AF evaluation value is the same as the imaging areas of the first imaging CCD 25, the second imaging CCD 26, and the third imaging CCD 27. Consequently, the focus lens 2 can be moved to focus the image within the focusing target area which is set by the cameraman.

Figure 15:
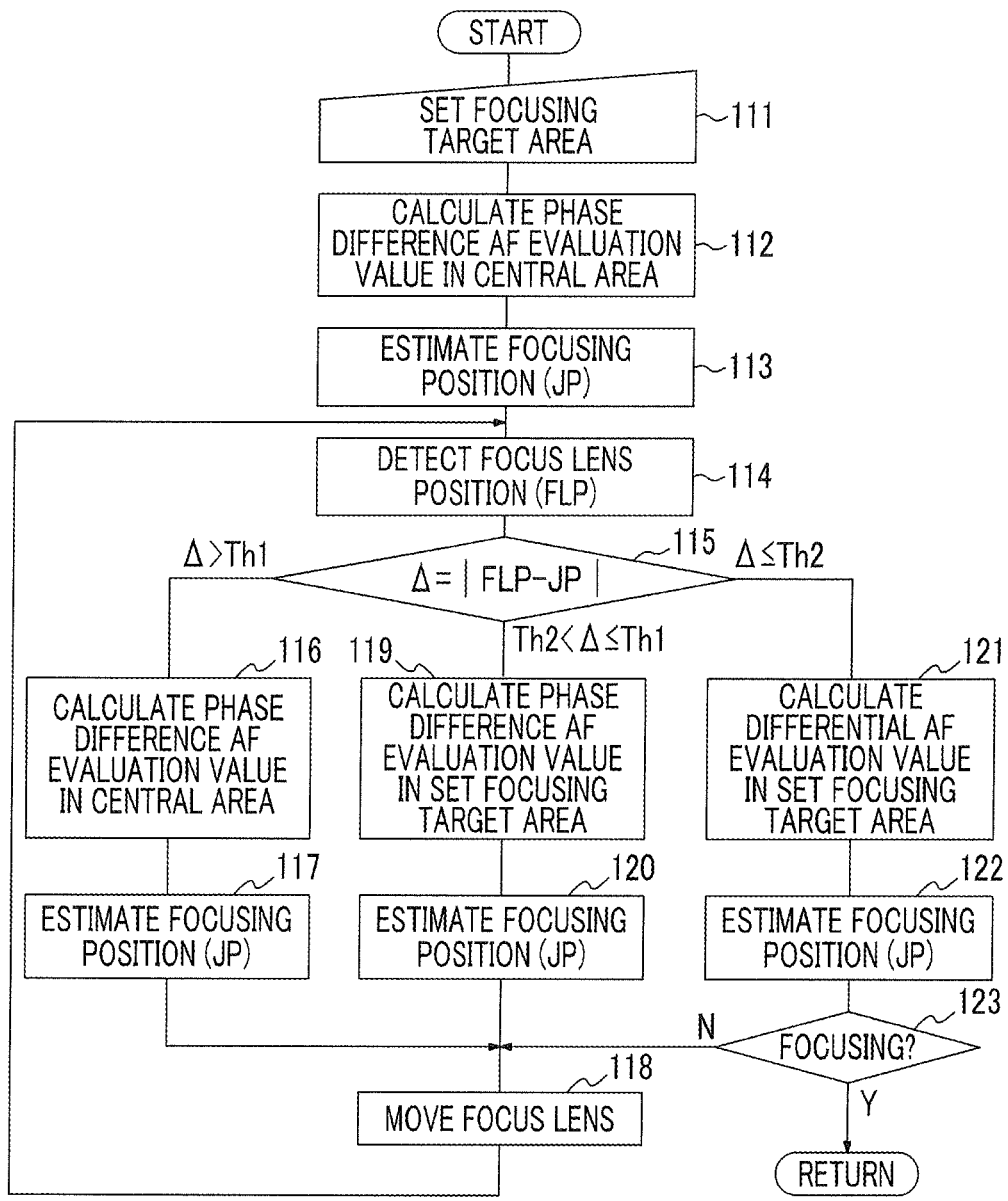
FIG. 15 is a flowchart showing a procedure of focusing processes.
Figure 16:
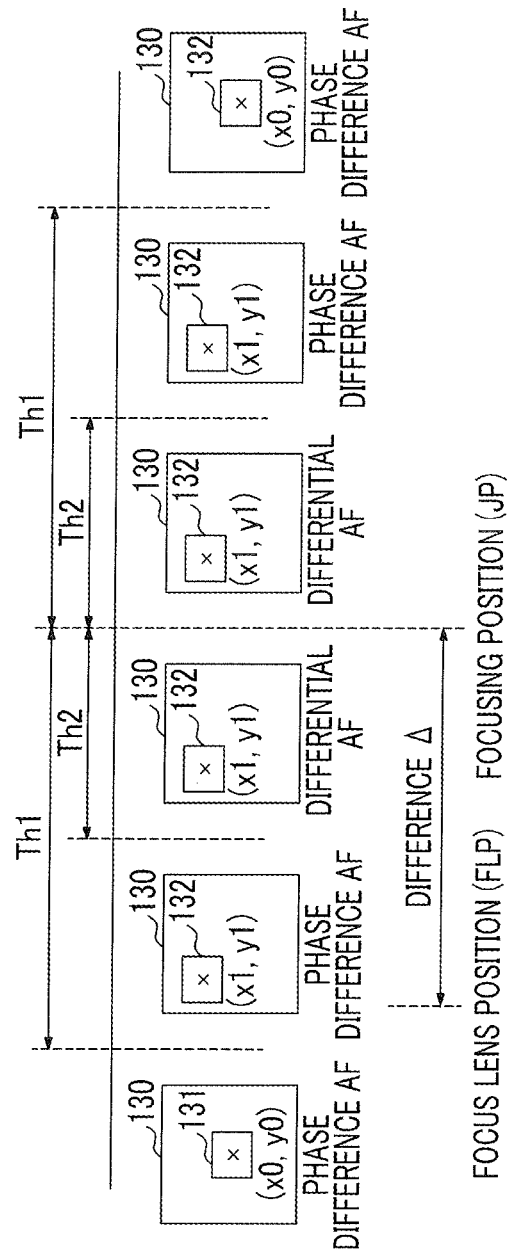
FIG. 16 shows a relationship between an imaging area and a central area or a focusing target area.

FIG. 15 is a flowchart showing a procedure of focusing processes. FIG. 16 shows a relationship between an imaging area 130 and areas 131 and 132 for calculating the AF evaluation value.

First, a cameraman sets the focusing target area as described above (step 111). In FIG. 16, the set focusing target area is represented by reference numeral 132.

Subsequently, the phase difference AF sensor 46 is controlled such that the output signal, which is obtained from the central area (center portion) of the phase difference imaging element 43, is input to the evaluation value calculation circuit 44 and the phase difference AF evaluation value is calculated (step 112). On the basis of the calculated phase difference AF evaluation value, the focusing position (referred to as JP) is estimated in the control device 60 (step 113). However, even when the focusing position is not necessarily estimated on the basis of the phase difference AF evaluation value which is obtained on the basis of the output signal obtained from the central area of the phase difference imaging element 43, the focusing position may be estimated on the basis of the phase difference AF evaluation value, which is obtained on the basis of the output signal obtained from the other area, and the differential AF evaluation value which is obtained from the optical path length difference AF sensor 55.

Subsequently, the control device 60 detects the position (referred to as FLP) of the focus lens 2 (step 114). When the focus lens 2 is at a home position as an initial position and is moved from the home position, the focusing evaluation value signal (the signal indicating the differential AF evaluation value, the signal indicating the phase difference AF evaluation value), which is used to move the focus lens 2, is input to the control device 60. Therefore, the position can be detected from the focusing evaluation value signal.

When the position of the focus lens 2 and the focusing position are obtained, a difference $\Delta=|FLP-JP|$ between the position of the focus lens 2 and the focusing position is calculated (step 115). If the difference $\Delta$ is greater than a first threshold value Th1, as shown in FIG. 16, the phase difference AF evaluation value is calculated on the basis of the output signal obtained from the central area 131 of the imaging area 130 of the phase difference imaging element 43 (step 116). On the basis of the calculated phase difference AF evaluation value, the focusing position is estimated (step 117). Further, the signal, which indicates the calculated phase difference AF evaluation value, is sent, as the focusing evaluation value signal, to the gain control amplification circuit 64. Thereby, the focus motor 65 is controlled such that it moves the focus lens 2 (step 118).

The position of the moved focus lens 2 is detected (step 114), and the difference $\Delta$ between the position of the focus lens 2 and the estimated focusing position is calculated (step 115).

If the calculated difference $\Delta$ is equal to or less than the first threshold value Th1 but is greater than a second threshold value Th2 (less than the first threshold value Th1), the phase difference AF evaluation value is calculated on the basis of the output signal obtained from the set focusing target area 132 (refer to FIG. 16) in the imaging area 130 of the phase difference imaging element 43 (step 119). On the basis of the calculated phase difference AF evaluation value, the focusing position is estimated (step 120). If the difference $\Delta$ is equal to or less than the first threshold value Th1, it can be considered that the subject has reached substantially the focusing position as described above. Therefore, it is possible to perform control to bring the focusing target area 132, which is set by the cameraman, into focus. As described above, the signal, which indicates the calculated phase difference AF evaluation value, is sent, as the focusing evaluation value signal, to the gain control amplification circuit 64. Thereby, the focus motor 65 is controlled such that it moves the focus lens 2 (step 118).

Once more, the position of the moved focus lens 2 is detected (step 114), and the difference $\Delta$ between the position of the focus lens 2 and the estimated focusing position is calculated (step 115).

If the calculated difference $\Delta$ is equal to or less than the second threshold value Th2, the differential AF evaluation value is calculated on the basis of the output signal obtained from the set focusing target area 132 (refer to FIG. 16) in the imaging area 130 of the first optical path length difference AF CCD 13 and the second optical path length difference AF CCD 14 constituting the optical path length difference AF sensor 55 (step 121). On the basis of the calculated differential AF evaluation value, the focusing position is esti-mated (step 122). If the focus lens 2 is not at the focusing position (NO in step 123), the signal, which indicates the calculated differential AF evaluation value, is sent, as the focusing evaluation value signal, to the gain control amplification circuit 64, and the focus lens 2 is moved (step 118). Thereafter, the difference $\Delta$ is calculated as described above, and the evaluation value calculation process corresponding to the calculated value and the like are performed. If the difference $\Delta$ becomes small, the focus lens 2 is moved on the basis of the differential AF evaluation value obtained from the optical path length difference AF sensor 55. Therefore, it is possible to precisely set the position thereof at the focusing position.

In the above-mentioned example, the phase difference AF evaluation value, which is obtained from the center portion 131 of the imaging area 130, is used if the calculated difference $\Delta$ is greater than the first threshold value, and the phase difference AF evaluation value, which is obtained from the focusing target area 132 of the imaging area 130, is used if the calculated difference $\Delta$ is equal to or less than the first threshold value. However, as described below, the above-mentioned focusing control may be performed on the basis of the phase difference AF evaluation value obtained from an extracted portion which gradually moves from the center portion 131 to the focusing target area 132, depending on a magnitude of the difference $\Delta$.

As shown in FIG. 16, central coordinates of the central area 131 are set as (x0, y0), and central coordinates of the focusing target area 132 are set as (x1, y1). Further, central coordinates of the extracted portion are set as (x, y). Although it is preferable that sizes and shapes of the central area 131, the focusing target area 132, and the extracted portion are the same, those may be not necessarily the same.

If the above-mentioned difference $\Delta$ is equal to or greater than "the first threshold value Th1+$\alpha$" ($\alpha$ is equal to or greater than 0) (third threshold value), the extracted portion is the same as the central area 131. That is, x=x0, and y=y0.

If the above-mentioned difference $\Delta$ is equal to or greater than "the first threshold value Th1-$\beta$" ($\beta$ is equal to or greater than 0 and is less than (the first threshold value Th1-the second threshold value Th2)) (fourth threshold value) and is less than "the first threshold value Th1+$\alpha$", central coordinates (x, y) of the extracted portion are obtained from Expressions 1 and 2.

$$x=x1+(\Delta-Th1+\beta)\times(x0-x1)/(\alpha+\beta) \qquad \text{Expression 1}$$

$$y=y1+(\Delta-Th1+\beta)\times(y0-y1)/(\alpha+\beta) \qquad \text{Expression 2}$$

If the above-mentioned difference $\Delta$ is less than "the first threshold value Th1-$\beta$", the extracted portion is the same as the focusing target area 132. That is, x=x1, and y=y1.

When the above-mentioned process is applied to the process shown in FIG. 15, in steps 116 and 119, the phase difference AF evaluation value, which is obtained from the extracted portion at the central coordinates (x, y) obtained as described above, may be calculated. However, if $\alpha$ is 0, the phase difference AF evaluation value, which is obtained from the extracted portion at the central coordinates (x, y) in the process of step 116, may be calculated. If $\beta$ is 0, the phase difference AF evaluation value, which is obtained from the extracted portion at the central coordinates (x, y) in the process of step 119, may be calculated.

Each of the first threshold value Th1, the second threshold value Th2, and $\alpha$ or $\beta$ mentioned above is not a unique value, and may be another value in accordance with whether the position of the focus lens 2 is Par from or close to the estimated focusing position, and may be another value in accordance with whether the estimated focusing position itself is far or near.

The center position (x, y) of the extracted portion is linearly changed between the center position (x0, y0) of the central area and the center position (x1, y1) of the focusing target area, but may be non-linearly changed or may be changed using a predetermined table.

Figure 17:
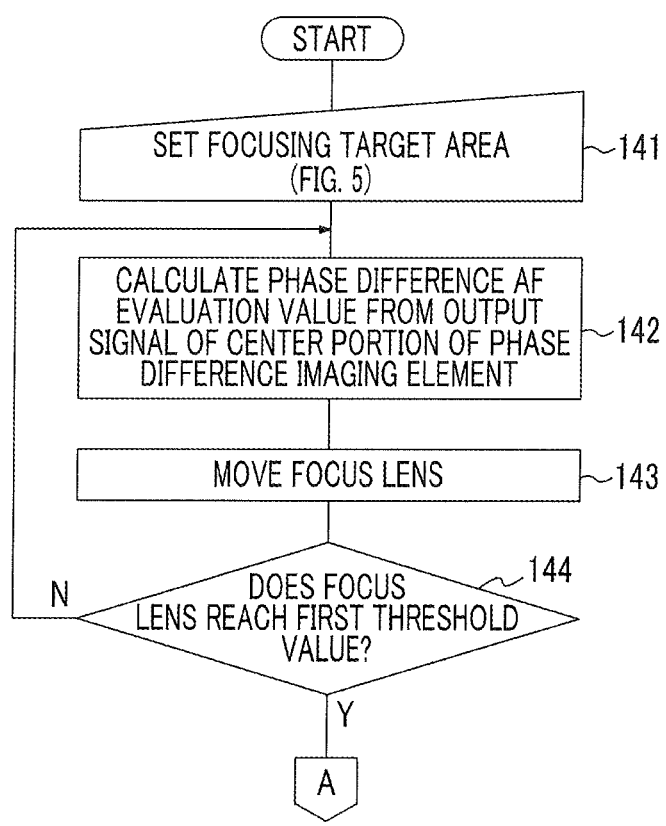
FIG. 17 is a flowchart showing a procedure of focusing processes.
Figure 18:
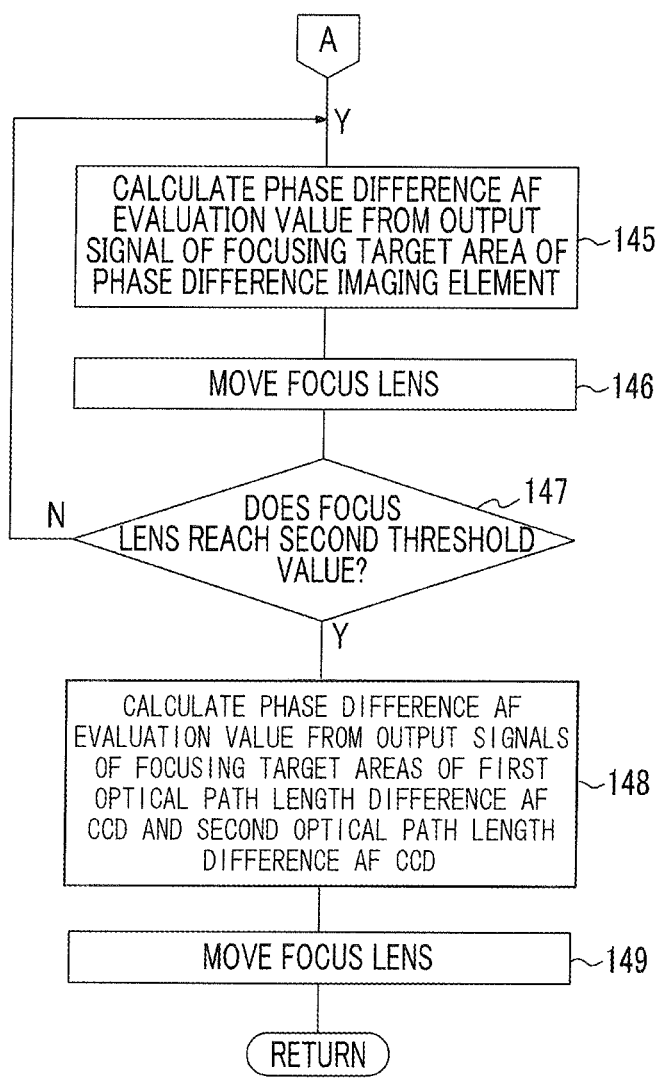
FIG. 18 is a flowchart showing the procedure of the focusing processes.

FIGS. 17 and 18 are flowcharts showing a procedure of focusing processes according to another example.

First, as shown in FIG. 5, a cameraman sets the focusing target area as described above (step 141).

The phase difference AF sensor 46 is driven, and the phase difference AF evaluation value is calculated on the basis of the output signal of the center portion of the phase difference imaging element 43 (step 142). The focus lens 2 is moved to approach the focusing position P0 on the basis of the obtained phase difference AF evaluation value (step 143). The processes of steps 102 and 103 are repeated until the focus lens 2 reaches the first threshold value position P20 or P21 as described above (step 144).

If the focus lens 2 reaches the first threshold value position P20 or P21 (YES in step 144), the phase difference AF evaluation value is calculated on the basis of the output signal obtained from the area corresponding to the focusing target area which is set by the cameraman in the light receiving surface of the phase difference imaging element 43 (step 145). The focus lens 2 is moved to approach the focusing position P0 on the basis of the calculated AF evaluation value (step 146). The processes of steps 145 and 146 are repeated until the focus lens 2 reaches the second threshold value position P30 or P31 (step 147).

If the focus lens 2 reaches the second threshold value position P30 or P31 (YES in step 147), the differential AF evaluation value is calculated from the output signal of the focusing target areas of the first optical path length difference AF CCD 13 and the second optical path length difference AF CCD 14 (step 148). The focus lens 2 is moved to approach the focusing position P0 on the basis of the calculated differential AF evaluation value (step 149). The focus lens 2 is controlled such that it focuses the image within the focusing target area which is set by a cameraman.

What is claimed is:

1. An auto-focus device comprising:
a focusing target area setting section that sets a focusing target area to be brought into focus in an imaging area;
a phase difference AF section that outputs a first focusing evaluation value signal, which indicates an amount of defocus, on the basis of an output signal which is obtained from one phase difference imaging element which forms a plurality of subject images, into which light incident through a focus lens is divided through a pupil division, on an imaging surface;
an optical path length difference AF section that outputs a second focusing evaluation value signal, which indicates an amount of defocus, on the basis of respective output signals of a first imaging element and a second imaging element which are disposed at positions where optical path lengths are different from each other in optical paths of light incident through the focus lens;
a focusing position estimation section that estimates a focusing position on the basis of at least one of the first focusing evaluation value signal and the second focusing evaluation value signal;
a focus lens position detection section that detects a position of the focus lens;
a focus lens position evaluation section that calculates a difference between the position of the focus lens and the focusing position estimated by said focusing position estimation section;
an AF switching section that sets, as a focusing evaluation value signal, the first focusing evaluation value signal which is output from said phase difference AF section on the basis of an output signal obtained from a center portion of the phase difference imaging element, when the difference between the position of the focus lens and the estimated focusing position is greater than a first threshold value, sets, as a focusing evaluation value signal, the first focusing evaluation value signal which is output from said phase difference AF section on the basis of an output signal obtained from the focusing target area of the phase difference imaging element, when the difference is greater than a second threshold value and is equal to or less than the first threshold value, and sets, as a focusing evaluation value signal, the second focusing evaluation value signal which is output to said optical path length difference AF section on the basis of output signals obtained from the focusing target areas of the first imaging element and the second imaging element, when the difference is equal to or less than the second threshold value; and
a focus lens movement control section that moves the focus lens on the basis of the focusing evaluation value signal which is output in said AF switching section.

2. The auto-focus device according to claim 1, wherein said AF switching section sets, as a focusing evaluation value signal, the first focusing evaluation value signal which is output from said phase difference AF section on the basis of an output signal obtained from an extracted portion of the phase difference imaging element, when the difference calculated in said focus lens position evaluation section is between a third threshold value which is equal to or greater than the first threshold value and a fourth threshold value which is equal to or greater than the second threshold value and equal to or less than the first threshold value.

3. The auto-focus device according to claim 1, wherein said focusing position estimation section performs first estimation after setting of the focusing target area performed by said focusing target area setting section by setting, as a focusing evaluation value signal, the first focusing evaluation value signal which is output from said phase difference AF section on the basis of the output signal obtained from the center portion of the phase difference imaging element.

4. The auto-focus device according to claim 1, wherein the phase difference imaging element is an area sensor.

5. The auto-focus device according to claim 1, wherein the focusing target area, the center portion, and the extracted portion have the same size.

6. A method for controlling operation of an auto-focus device, the method comprising:
setting a focusing target area to be brought into focus in an imaging area, through a focusing target area setting section;
outputting a first focusing evaluation value signal, which indicates an amount of defocus, on the basis of an output signal which is obtained from one phase difference imaging element which forms a plurality of subject images, into which light incident through a focus lens is divided through a pupil division, on an imaging surface, through a phase difference AF section;

outputting a second focusing evaluation value signal, which indicates an amount of defocus, on the basis of respective output signals of a first imaging element and a second imaging element which are disposed at positions where optical path lengths are different from each other in optical paths of light incident through the focus lens, through an optical path length difference AF section;

estimating a focusing position on the basis of at least one of the first focusing evaluation value signal and the second focusing evaluation value signal, through a focusing position estimation section;

detecting a position of the focus lens through a focus lens position detection section;

calculating a difference between the position of the focus lens and the focusing position estimated by the focusing position estimation section, through a focus lens position evaluation section;

setting, as a focusing evaluation value signal, the first focusing evaluation value signal which is output from the phase difference AF section on the basis of an output signal obtained from a center portion of the phase difference imaging element, when the difference between the position of the focus lens and the estimated focusing position is greater than a first threshold value, setting, as a focusing evaluation value signal, the first focusing evaluation value signal which is output from the phase difference AF section on the basis of an output signal obtained from the focusing target area of the phase difference imaging element, when the difference is greater than a second threshold value and is equal to or less than the first threshold value, and setting, as a focusing evaluation value signal, the second focusing evaluation value signal which is output to the optical path length difference AF section on the basis of output signals obtained from the focusing target areas of the first imaging element and the second imaging element, when the difference is equal to or less than the second threshold value, through an AF switching section; and moving the focus lens on the basis of the focusing evaluation value signal which is output in the AF switching section, through a focus lens movement control section.

* * * * *